(12) United States Patent
Cope (10) Patent No.: US 8,914,519 B2
(45) Date of Patent: *Dec. 16, 2014

(54) REQUEST TRACKING FOR ANALYSIS OF WEBSITE NAVIGATION

(75) Inventor: Brian Charles Cope, Berkshire (GB)

(73) Assignee: International Business Machines Corporation, Armonk, NY (US)

( * ) Notice: Subject to any disclaimer, the term of this patent is extended or adjusted under 35 U.S.C. 154(b) by 146 days.

This patent is subject to a terminal disclaimer.

(21) Appl. No.: 12/035,584

(22) Filed: Feb. 22, 2008

(65) Prior Publication Data

US 2008/0168169 A1 Jul. 10, 2008

Related U.S. Application Data

(63) Continuation of application No. 09/972,343, filed on Oct. 5, 2001, now Pat. No. 7,346,703.

(30) Foreign Application Priority Data

Oct. 13, 2000 (GB) .................................. 0025299

(51) Int. Cl.
G06F 15/16 (2006.01)
G06F 15/173 (2006.01)
G06F 11/34 (2006.01)

(52) U.S. Cl.
CPC ........ *G06F 11/3476* (2013.01); *G06F 11/3495* (2013.01); *G06F 11/3438* (2013.01); *G06F 2201/875* (2013.01)
USPC ............................ 709/227; 709/219; 709/224

(58) Field of Classification Search
USPC ........................ 709/224–225, 219, 217, 227
See application file for complete search history.

(56) References Cited

U.S. PATENT DOCUMENTS

| 5,712,979 | A | | 1/1998 | Graber et al. ................. 395/200 |
| 5,717,860 | A | | 2/1998 | Graber et al. ................. 395/200 |
| 5,751,956 | A | | 5/1998 | Kirsch .......................... 395/200 |
| 5,812,769 | A | | 9/1998 | Graber et al. ................. 395/200 |
| 5,870,546 | A | | 2/1999 | Kirsch .......................... 395/200 |
| 5,884,312 | A | * | 3/1999 | Dustan et al. ....................... 1/1 |
| 5,951,694 | A | | 9/1999 | Choquier et al. ............... 714/15 |
| 6,112,240 | A | * | 8/2000 | Pogue et al. ................. 709/224 |

(Continued)

FOREIGN PATENT DOCUMENTS

WO WO99/57865 11/1999

*Primary Examiner* — Jeong S Park
(74) *Attorney, Agent, or Firm* — Steven M. Greenberg, Esq.; CRGO Law (57) ABSTRACT

Provided are methods, apparatus and computer programs for enabling tracking of a user's sequence of Web Browser requests when navigating within a single Web site. Requests for access to resources within the Web site are compared with redirection criteria and, if matching, are redirected to a request tracker which determines a session identifier (generating a new session ID if required), then logs the request and then redirects the request back to the Web server for processing. This method uses a request tracker outside the scope of the Web server program, addressing the inability of many current Web servers to support cookies and avoiding major rewriting of the Web site. The resources within the Web site for which tracking is implemented are renamed on the Web server and the redirected requests are also renamed to be consistent with the renamed resources but to avoid repeated matching with the redirection criteria. This ensures that an incoming request is redirected to the tracker once only, and after forwarding back to the Web server is processed in a conventional way without repeated redirection to the request tracker.

9 Claims, 4 Drawing Sheets

(56) References Cited

U.S. PATENT DOCUMENTS

| | | | |
|---|---|---|---|
| 6,671,724 B1 * | 12/2003 | Pandya et al. | 709/226 |
| 6,826,624 B1 * | 11/2004 | Fell, Jr. | 709/245 |
| 7,188,181 B1 * | 3/2007 | Squier et al. | 709/228 |
| 7,346,703 B2 * | 3/2008 | Cope | 709/238 |

\* cited by examiner

| Session Identifier | Method | URL | Timestamp | Request Number | Seconds Since Last Request |
|---|---|---|---|---|---|
| IIORC5IAAAAACCIUDC5AAAA | GET | http://aida/~ast/speech.htm | 1999-11-04-09.28.14.000000 | 20 | +1.7620000000000E+000 |
| IIVERQIAAAAAKCIUDC5AAAA | GET | http://aida/~ast/index.htm | 1999-11-04-09.31.29.000000 | 0 | -1.0000000000000E+000 |
| IIVERQIAAAAAKCIUDC5AAAA | GET | http://aida/~ast/services.htm | 1999-11-04-09.31.45.000000 | 1 | +1.6003000000000E+001 |
| IIVERQIAAAAAKCIUDC5AAAA | GET | http://aida/~ast/speech.htm | 1999-11-04-09.31.48.000000 | 2 | +3.0740000000000E+000 |
| IIVERQIAAAAAKCIUDC5AAAA | GET | http://aida/~ast/speech03.htm | 1999-11-04-09.32.05.000000 | 3 | +1.6924000000000E+001 |
| IIORC5IAAAAACCIUDC5AAAA | GET | http://aida/~ast/index.htm | 1999-11-04-09.32.13.000000 | 21 | +2.3862300000000E+002 |
| IIORC5IAAAAACCIUDC5AAAA | GET | http://aida/~ast/services.htm | 1999-11-04-09.32.18.000000 | 22 | +4.9280000000000E+000 |
| IIORC5IAAAAACCIUDC5AAAA | GET | http://aida/~ast/defence.htm | 1999-11-04-09.32.21.000000 | 23 | +3.4450000000000E+000 |
| IIORC5IAAAAACCIUDC5AAAA | GET | http://aida/~ast/index.htm | 1999-11-04-09.32.38.000000 | 24 | +1.6243000000000E+001 |
| IIORC5IAAAAACCIUDC5AAAA | GET | http://aida/~ast/services.htm | 1999-11-04-09.32.42.000000 | 25 | +3.8450000000000E+000 |
| IIORC5IAAAAACCIUDC5AAAA | GET | http://aida/~ast/speech.htm | 1999-11-04-09.32.46.000000 | 26 | +4.7170000000000E+000 |
| IIVERQIAAAAAKCIUDC5AAAA | GET | http://aida/~ast/speech.htm | 1999-11-04-09.32.52.000000 | 4 | +4.7599000000000E+001 |
| IIVERQIAAAAAKCIUDC5AAAA | GET | http://aida/~ast/k_l.htm | 1999-11-04-09.32.55.000000 | 5 | +3.1840000000000E+000 |
| IIORC5IAAAAACCIUDC5AAAA | GET | http://aida/~ast/speech04.htm | 1999-11-04-09.32.59.000000 | 27 | +1.2718000000000E+001 |

FIG. 4

REQUEST TRACKING FOR ANALYSIS OF WEBSITE NAVIGATION

CROSS-REFERENCE TO RELATED APPLICATIONS

This application is a Continuation of U.S. application Ser. No. 09/972,343, filed on Oct. 5, 2001, which is incorporated herein by reference in its entirety.

FIELD OF INVENTION

The present invention relates to tracking a sequence of Web Browser requests for access to resources within a website, to enable analysis of an individual user's website navigation.

BACKGROUND

As the use of the internet continues to grow, and the provision and use of electronic business solutions rapidly increases, the requirement for organisations to understand the effectiveness of their websites is growing in importance. While there are a number of techniques available for analysing site usage, it continues to prove difficult to be able to track an individual visitor to a website through the pages they visited, particularly for websites consisting entirely or primarily of static HTML pages.

There are significant reasons for wanting to track individuals' navigation within a Website, related to understanding the way the website is being used:

Firstly, by analysing the sequences of pages visited by each individual, a pattern of how visitors navigate through the site can be formed. This can be extremely useful in understanding why certain pages appear more popular than others. For example, it may be found that certain areas of the site are very rarely visited, and the visits to those pages are only made via tortuous navigation paths through other pages. This would indicate a problem with the website design which can be addressed to enable easier navigation to all parts of the site. Alternatively, it may be found that the rarely visited pages are found via a fairly direct route. This would tend to indicate either that the pages themselves are simply not of interest, or that the links to them are poorly worded or positioned, thereby failing to attract visitors.

By examining the common paths through the site, it may also be possible to identify different types of visitor. For example; expert users, casual browsers, people with a keen interest in a particular area and electronic crawler agents might all visit the site and have very different navigation patterns. By identifying these different patterns, modifications might be made to the site design to attract primarily those with a keen interest, perhaps through new navigation links from top-level pages.

Secondly, by analysing the associations between pages visited within a browsing session on a website, a picture of the types of visit can be formed. This might indicate general browsing, in which many top-level pages are visited but few pages containing any detail are accessed, detailed browsing, in which detail pages are accessed across the whole site, or specific information gathering, in which a particular area of the website is visited including much detailed information. Other patterns based on these may also be observed. By examining these patterns, the website owners can gain valuable insight into the reasons for people visiting the site, and perhaps whether those visits appear successful, by also examining the pages from which visitors exit the site.

A more detailed examination of page associations might highlight interesting correlation between parts of the site. For example, a financial services organisation's website might contain separate areas for corporate finance, domestic insurance, general financial advice and personal banking. By examining the associations between pages visited in a single session, it would be possible to find out what proportion of people using the personal banking services also accessed the general advice pages, for instance. Such insight into the way the site is used might both provide a better understanding of how the organisation should market its products and services, and enable improvements to the website design to allow better navigation between related areas.

Put together with the analysis of navigation paths, it would even be possible to determine that, for example, a significant number of visitors repeatedly jumped between the personal banking services and the financial advice pages to find definitions of terms they did not understand. By providing quick links to this information, the website could be made much more accessible to these visitors, thereby improving the marketability of the services.

The most common mechanism which is currently available for analysing website usage is through the examination of the server logs produced by a web server. These logs typically record the details of each request made on the server, in terms of where the request came from, what the request was and how it was responded to. This information would usually include:

Ÿ the IP address of the computer from the request was received,
Ÿ the URL requested and the method of the request (usually HTTP GET or HTTP POST),
Ÿ the date and time of receipt of the request,
Ÿ a response code (indicating 'page served', 'page already cached', 'page not found', 'unauthorised access' etc.),
Ÿ the number of bytes served in response to the request,
Ÿ optionally, depending on the web server configuration, the URL of the page from which the request was referred, i.e. the page from which a hyperlink was followed to make this request, for example,
Ÿ optionally, depending on the web server configuration, the characteristics of the computer on which the response will eventually be displayed, in terms of browser and operating system name and version.

While these server logs provide a lot of useful information about the pages served, number and type of failures and perhaps the computers being used to browse the Website, there are two major problems:

Ÿ Every single request coming into the Web server is logged, whether it be for an important page on the site, a minor page of little relevance or even an image to be displayed somewhere on an already served page. This means that the logs get very large and contain a lot of clutter which can hide the important information.
Ÿ More importantly, the IP addresses logged are those from which the Web server receives the request. In the vast majority of cases, people using the World Wide Web access it via a proxy server owned by their Internet Service Provider (ISP). Many other users access the Web via their employer company's proxy server. When examining server logs, therefore, certain IP addresses are repeated very regularly, these being the proxy servers of the most popular ISPs and, to a lesser extent, large employers. This implies that there is no information to tie any request to a particular computer on which the response will be displayed, and there is no means of tying any two requests together to say that these two requests came from the same Website visitor.

Any analysis of site navigation as described above is therefore at best based on guesswork to try to match requests together, and at worst impossible.

There are two main ways of marking requests to identify them with a browser session.

Ÿ The first is to use 'cookies'. These are server generated identifiers stored on the computer of the person browsing the site, which are sent to the server with each request. However, many Web servers are only capable of serving static HTML pages and cannot make use of cookies. For the majority of current Websites, therefore, the use of cookies has not been possible.

Ÿ The alternative is to use URL rewriting in which a unique session identifier is attached to each request as part of the URL. In order to make use of this technique, any hyperlink within a page must have a dynamic element which enables a session identifier, once generated, to be encoded within the URL of any request made by clicking on that hyperlink. For an existing Website which does not currently have this built in, this would involve considerable effort in modifying each page of the Website to enable it.

Therefore, for the majority of current Websites on conventional Web servers, no satisfactory solution is known for identifying and logging a sequence of requests to a Web server from the same browser. The available solutions require considerable effort to modify the Web site or the Web server.

U.S. Pat. Nos. 5,751,956 and 5,870,546 disclose a solution to the problem of tracking user selection of specific hyperlinks to remote servers, such as when a user clicks an advertising link within a displayed Web page to jump to the advertiser's Website, to measure the effectiveness of the advertisement. A significant problem when tracking links between different sites is that the server of a page which includes an advertisement hyperlink is typically not involved in a subsequent independent Browser transaction in which the advertised page is requested. Since no single server is involved in the full sequence of Website accesses, there is no server which is able to track the user's navigation between sites. This problem is solved by inserting specific modified hyperlinks into Web pages. A Web server provides to a client system a Web page which includes a hyperlink encoded with redirection and accounting data. When a user selects the hyperlink, the Web server receives from the client system a predefined URL reference including the encoded data. This is then decoded, the accounting data is stored and a redirection message is sent back to the client system.

Thus, U.S. Pat. No. 5,751,956 and U.S. Pat. No. 5,870,546 focus on the problems of tracking links between sites to enable measurement of advertising effectiveness, and solve this by means of a server process which creates a new form of encoded hyperlink and which subsequently decodes and processes encoded data for redirection and accounting. The only disclosure of tracking a user's navigation within a single site is a suggestion (in column 3) that access counters using CGI programs provide a reasonable manner of accounting for single-server Web page accesses. Although certain problems with CGI programs are described, there is no disclosure of the problems addressed by the present invention. Column 4 discloses a mechanism for URL redirection but it is suggested that this mechanism precludes tracking of the user's navigation, and additional problems are identified without a disclosure of solutions.

International patent application WO99/57865 similarly relates to tracking user selection of links to resources which are external of the tracking server system.

U.S. Pat. Nos. 5,712,979, 5,717,860 and 5,812,769 relate to tracking the navigation path of a user when linking from a first Web site to a second Web site. A URL received at the second Web site includes an identification of the first Web site. A destination Web page is determined for the user, and a code identifying the first Web site is attached to a Web page link associated with the destination Web page. The destination Web page including this code is transmitted to the user. This attaching of navigational history information allows determination of the previous Web site visited by the user.

None of the identified prior art discloses a solution to the problem of how to identify and log a sequence of requests to a specific Web server from a Web Browser, which differentiates between different users even if they access the Web via a common proxy server, and which does not require major modifications to the large number of current Web sites or servers which do not support cookies or dynamic encoding of URLS.

SUMMARY OF INVENTION

In a first aspect, the present invention provides a method for tracking a plurality of Web Browser requests for access to resources within a particular Website, by redirecting said requests via a request tracker (preferably a servlet implemented on a Web application server) which logs each request. The method preferably comprises: comparing requests, which are sent from a Web Browser to a Web server for access to resources within the Web site, with a set of redirection criteria; forwarding to a request tracker each request which matches the redirection criteria; and the request tracker determining a session identifier, logging the request together with the session identifier, and forwarding the request to the Web server for processing.

The method preferably also includes: for a set of resources on the Web server for which tracking is required, replacing original resource names with new resource names; and, for requests which match the redirection criteria and which include said original resource names, replacing the original resource names with the new names such that requests forwarded to the Web server by the request tracker include the new names for accessing the renamed resources.

According to a first embodiment of the invention, the resources for which access logging is required are firstly renamed on the Web server and one or more redirection statements are added to the Web server's configuration files. After renaming and addition of the redirection statements, any subsequent requests for resource access which match the criteria of the redirection statement(s) are redirected to a request tracker servlet on a Web application server. This servlet executes a logging process and then redirects the request back to the original Web server using the new resource name. The resource name included within a redirected request is the new name of the resource which was renamed on the Web server, and modification of the request to update this resource name is performed either (i) by the request tracker servlet or (ii) when the first redirection is performed by reference to the Web server's redirection statements. The logging process logs the request details together with a session identifier (which may be an explicit session identifier or an identifier of the client system or end user) which is preferably generated and attached to the request though use of cookies. A cookie including the session identifier is returned to the original requestor's computer together with the response to the original request.

The redirection statements, resource renaming and logging of the invention may be made applicable to all Web pages within a Web site or to only certain resource access requests (for example to log only key navigation pages to limit the size of the logs), and may be further tailored to log image or audio file requests, LDAP directory requests, etc, in addition to HTML requests.

The invention enables the owner of a website to track an individual as they navigate through the Website within a single browsing session. This is preferably implemented with only minimal changes to the Website, thereby making the process quick and inexpensive to implement. This is clearly a great advantage for companies who have already created a comprehensive Website and now want to quickly put in place a mechanism for tracking navigation within their site without major expense. The ease of implementation of the invention is also clearly valuable to companies offering navigation analysis as part of Website development services.

The step of renaming resources and making consistent changes to resource names in redirected requests is advantageous since it avoids a redirected request which is sent back from the application server from being repeatedly redirected to the application server. After the resource name in a request has been changed in this way, it will not match the redirection statement in the Web server and so will avoid repeated redirection.

Because the invention can be implemented without any changes to the original Browser requests, no bookmarks or hyperlinks need to be changed, including those within renamed pages. Such hyperlinks will still link to the original resource names, and will then be redirected to the renamed resources via the application server. Users will typically see no difference between the original Web site and the site after its modification to implement the invention, other than possibly redirection messages being briefly flashed on screen and the response URLs being modified from that requested.

In a second aspect, the invention provides apparatus implementing the steps of the method described above. The apparatus preferably comprises a Web server and a Web application server running on the same or different computers, wherein: the Web server includes means for performing a rename operation for resources stored on the Web server, for replacing original resource names with replacement resource names, and means for inserting redirection statements in the Web server's configuration file such that requests for access to resources stored on the Web server, which requests use the original resource names and match the redirection statement criteria, will be redirected to the Web application server; and the Web application server includes a request tracker for logging the redirected requests and for redirecting the requests back to the Web server. The Web server then processes the requests to access the renamed resources. The request details which are logged include a session identifier.

In a further aspect, the invention provides a method of instrumenting a Web server to enable tracking of Web site navigation, the method comprising: performing a rename operation for resources stored on the Web server, to replace original resource names with replacement resource names; inserting redirection statements in the Web server's configuration file such that requests for access to resources stored on the Web server which use the original resource names and which match redirection criteria of the redirection statements will be redirected to a specified request tracker (preferably a servlet implemented on a Web application server); providing the request tracker, which includes means for logging the redirected requests and then redirecting the requests back to the Web server for processing the requests to access the renamed resources.

The present invention may be implemented by computer program code which is recordable on a machine readable recording medium, for controlling the operation of a data processing apparatus on which it runs to perform a method as described above.

BRIEF DESCRIPTION OF DRAWINGS

Embodiments of the present invention will now be explained in more detail, by way of example, with reference to the accompanying drawings in which:

FIG. 4 is a sample of records obtainable from use of an embodiment of the present invention.

DETAILED DESCRIPTION OF PREFERRED EMBODIMENTS

Figure 1:
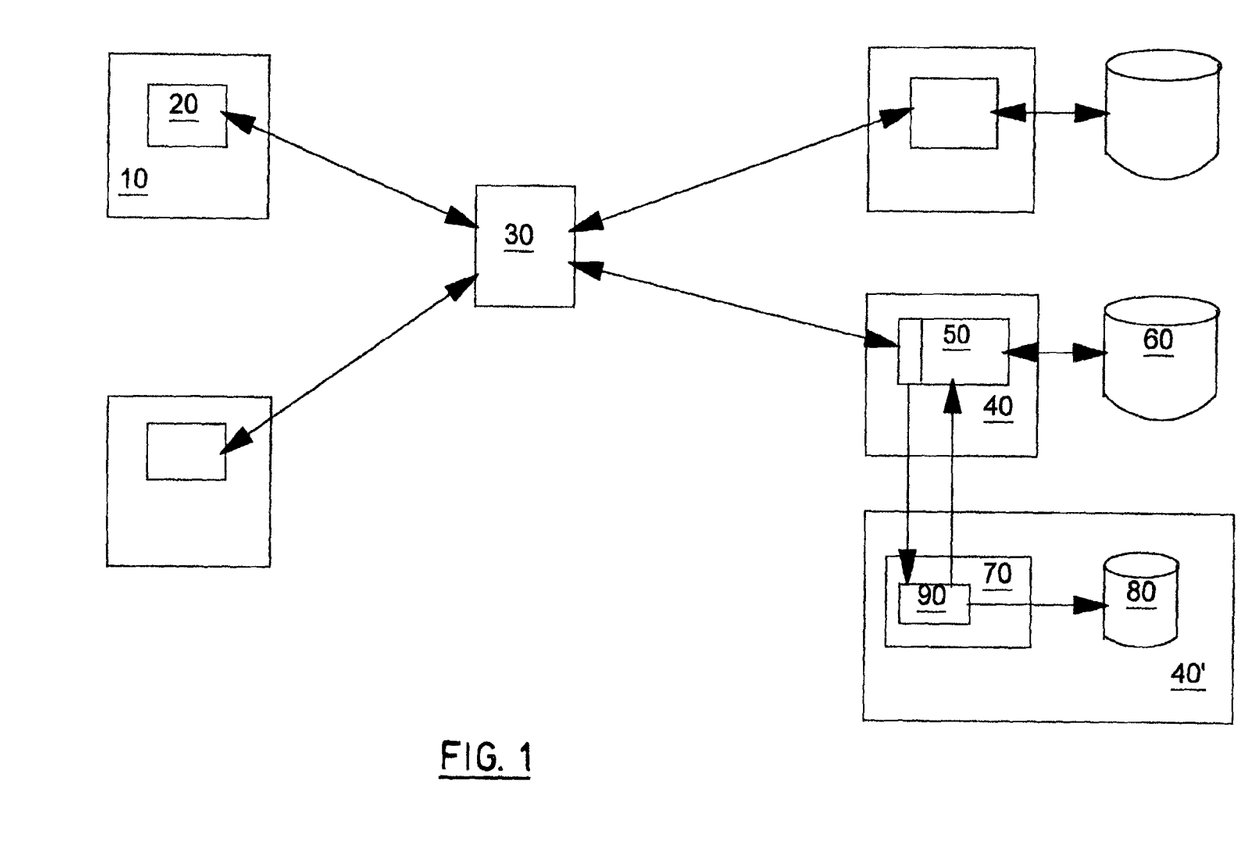
FIG. 1 is a schematic representation of a computing network, showing the major components for implementing the present invention according to a preferred embodiment.

FIG. 1 shows a number of computers connected together within a computing network. The network may be the Internet or an intranet. A first client computer 10 has a Web Browser 20 installed thereon which sends HTTP requests, LDAP requests, etc via a proxy server 30 to any number of Web server computers 40 or directory servers connected to the network. Each Web server computer 40 has installed thereon a Web server program 50 for managing access to resources (HTML Web pages, image files, and other data) stored, for example, on peripheral disk storage 60. Many Web servers can only serve static resources and cannot run the code required to track navigations within a Web site.

Also running within the network is a Web application server 70, which may be running on the same or a different computer 40' from that running the Web server 50. The Web application server 70 communicates with a request log on disk storage 80 and is running a request tracker program 90. Thus, it can be seen that the Web server 50, Web application server 70 and request tracker 90 are all implementable in software. The request tracker 90 is preferably implemented as a Servlet written in the Java™ programming language and running within a Java Virtual Machine on the Web application server. The general use of Servlets for running code on a server machine in response to an HTTP request from a client is known in the art.

Preferred embodiments of the present invention use HTTP request redirection via the request tracker Servlet 90 running on the Web application server 70 to log each request made on a Website, or to log each request for access to selected resources.

The invention is implementable for an existing Web site by making minimal changes to the Web site. The Web site changes made in a first implementation are renaming of the extensions to each page in the site (for example, using the dos command "ren *.html *.htm" in the site documents folder), and the addition of one or more redirection statements in the Web server's configuration file. Standard Web servers are typically configured through a simple text file. This file contains statements about such things as how to deal with cgi requests, what access control should be enforced, what the Web server log should record about each request, where logs should be stored etc. It can also contain statements about 'aliases', which direct requests matching a given string to particular resources on the host machine, and 'redirections', which redirect requests matching a given string to an alternative request. Examples of redirection statements which can be added to the configuration text file will be given later.

On restarting the Web server process 50, each subsequent request to a page matching the redirection statement criteria is redirected to the Web application server 70 (on the same or a different computer). This application server 70 runs the request tracker Servlet 90 which logs the request details, together with a session identifier generated through the use of cookies, and then redirects the request back to the original Web server 50 with a modified extension for the requested page.

As is known in the art, cookies are a technology for turning stateless one-hit Web requests into communication sessions, by enabling a Web server to automatically recognize a particular Web Browser when it returns to a Web site within a set time, and for storing user profile information in the Browser. Cookies permit a server to tell a Browser to store a block of information on the user's computer hard disk, and to attach it to subsequent requests to the same server. However, previous use of cookies has relied on the development of Web servers which support this technology and, although most current Browsers support cookies, many current Web servers do not.

Because the invention facilitates the use of original requests which are exactly as they were prior to adding the logging mechanism, no bookmarks or hyperlinks need to be changed when the invention is implemented, including those within renamed pages; they should still link to the old names, which will get redirected to the new names via the logging and redirection process. The site visitors should see no difference between the original site and the modified site, other than perhaps a flash of a redirection message and the response URL being slightly modified from that requested.

In a first example system implementing the invention, every page on the website with extension ".html" was renamed to have the extension ".htm". Two redirection statements were added to the web server configuration. The first statement redirected any request to the home directory of the website to the renamed home page of the website via the application server. The second statement redirected any request for a page with extension ".html" to the same page with extension ".htm", again via the application server. This was achieved by redirecting "<site home>/*.html" to the URL: "http://<app server>/servlet/PageServer/http://<original web server>/<site home>/*.htm", where <app server> indicates the computer running the logging application, "servlet/PageServer" indicates the name of the servlet application running on the application server to log the request and redirect back to the URL which follows as extra path information, <original web server> indicates the computer running the original web site (whose configuration now includes this redirection statement, and <site home> indicates the URL path to the home directory of the web site on its server (this path may be empty or may contain one or more directories).

An example redirection statement in the IBM HTTP Server configuration on a web server called aida might read: RedirectMatch(.*)\.html$"http://tosca/servlet/PageServer/http://aida/$1.htm"

The PageServer servlet extracts the extra path information provided in any request coming to it (by redirection from the original request), logs it to a database such as IBM Corporation's DB2 database, and then redirects the request back to the path that was logged. The actual data logged is the URL and method of the request, the date and time of the request, and information about the session within which the request occurred. Session tracking is implementable by using a Web application server (such as IBM Corporation's WebSphere Application Server), configured in this case to use cookies for session tracking. This provides a mechanism by which each request can be tied to an identifier for the session. This identifier is uniquely generated and persists across any requests received from the same browser within a set time between subsequent requests (for example, the time may be configured to be 30 minutes). Extra data can also be tied to this session identifier, and thereby be made persistent across requests within a session. In the case of the PageServer servlet according to the above example implementation of the invention, the time of the last request is stored, as is the number of requests made within this session. The session information logged with each request is therefore the session identifier, the number of this request within the session, and the time elapsed in seconds since the last request (or −1 if this is the first request in a session). (IBM, WebSphere and DB2 are trademarks of International Business Machines Corporation.)

The redirection statements and page renaming can be tailored to redirect only certain requests, for example to log only the key navigation pages, or to log image requests or LDAP requests to an LDAP directory server as well as HTML requests.

Figure 2:
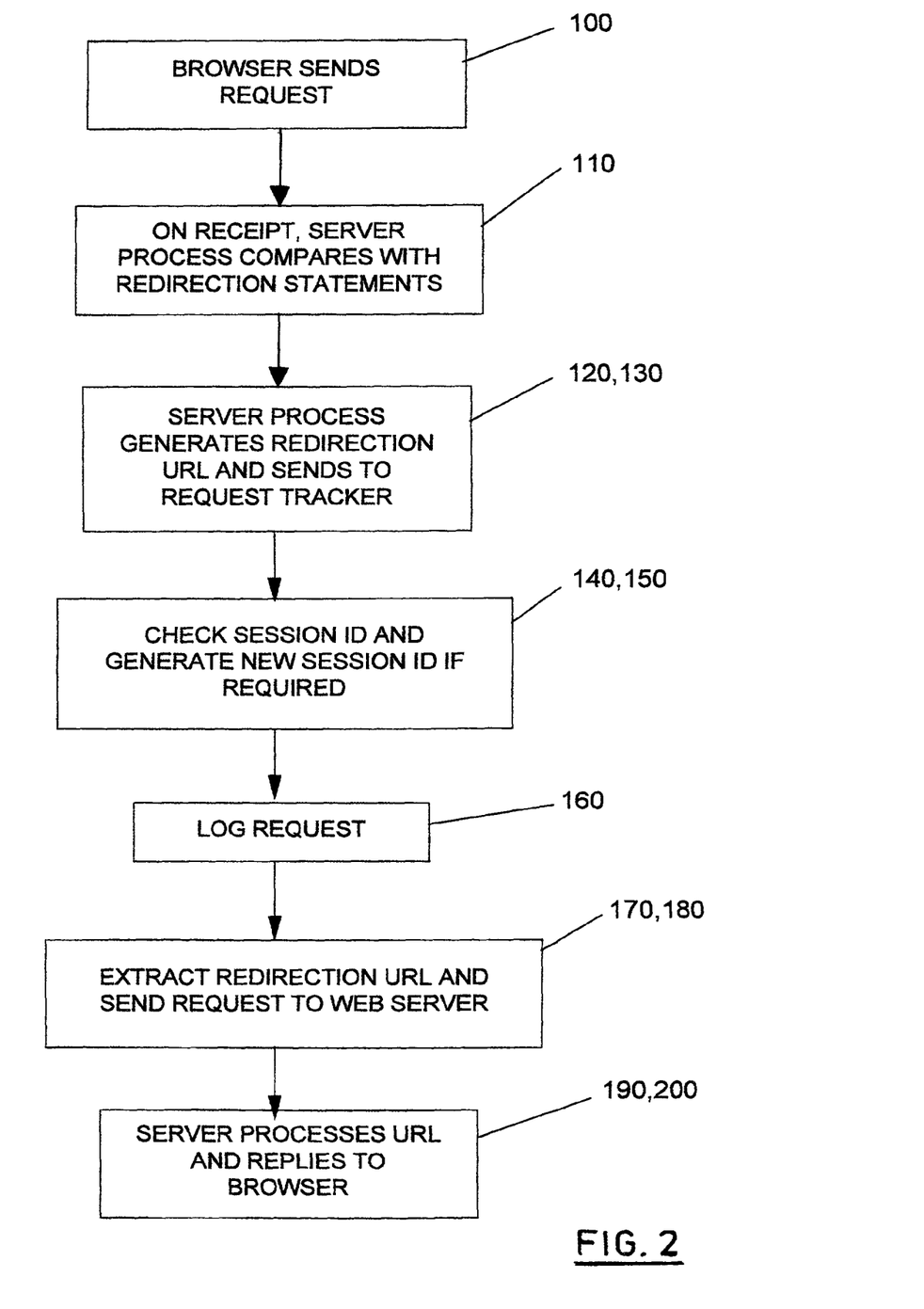
FIG. 2 is a schematic flow diagram showing the sequence of steps to be performed to implement the present invention according to a preferred embodiment.
Figure 3:
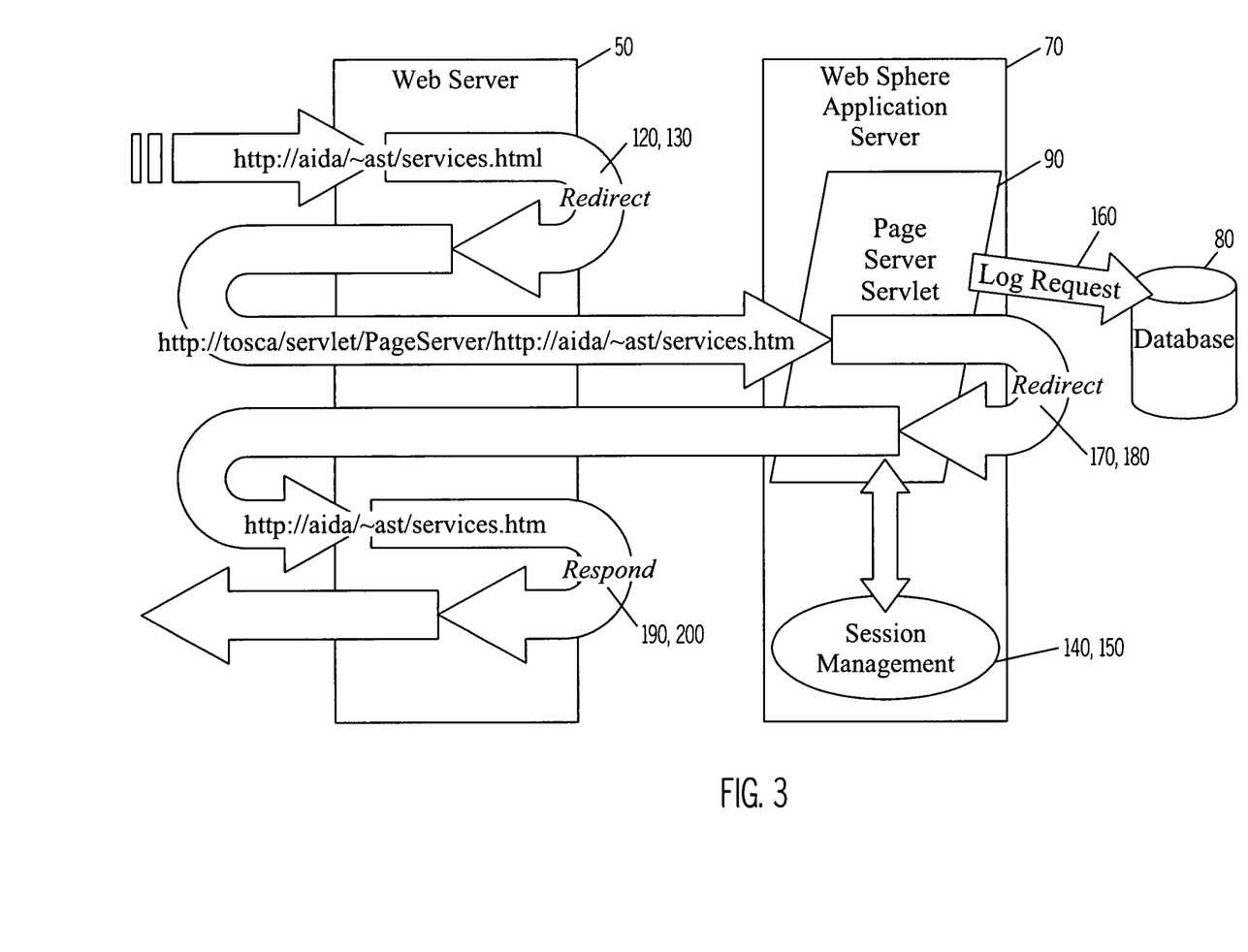
FIG. 3 is a schematic representation of the flow of a request through a Web server and Web application server in accordance with an embodiment of the invention.

The flow of a request through the set of network components according to an embodiment of the invention is summarised by FIGS. 2 and 3. FIG. 2 shows the steps performed according to the invention when a Web Browser sends 100 a request to a Web server. The Web server responds to the received request from the browser by comparing 110 the received HTTP request with strings specified within the redirection statements in the Web server's configuration file, using a simple string matching process. For matched requests, a redirection URL is generated 120 in accordance with the redirection statements and the request is sent 130 to the request tracker servlet which is identified in the redirection URL. The request tracker examines 140 the redirected request to see whether it has a cookie attached. If so, this cookie's session identifier is used, and if not then a new session identifier is generated 150 and attached to a new cookie. The servlet then logs 160 the request, for example writing records to a database table using the known Java Database Connectivity (JDBC) application program interface or by writing text to a log file using standard Java text output functions. The request tracker extracts 170 a redirection URL from the request (or, alternatively, generates a further redirection URL using the request). The request, together with the respective cookie (either pre-existing or newly generated) and its session identifier, is then sent 180 back to the Web server. The Web server processes the URL to access 190 the desired (renamed) Web page and returns this 200 to the client with the cookie. This cookie would automatically be attached to any subsequent requests within the same client session by the browser on the client machine.

In one embodiment, the URLs for redirection are actually sent back to the client (prior to steps 130 and 180), and the client responds by immediately sending this as a new request which in step 120 will go to the application server and in step 180 will go back to the web server. This means that the client browser is actually making three requests (original to web server, redirected 130 to application server which logs 160 and responds with a cookie, and finally redirected 180 to the modified url on the web server).

One particular embodiment of the request tracker Servlet 90 comprises the following Java classes:

PageLogger which extracts the URL of a request and passes it to a RequestLogger object;

PageServer which implements the same methods as PageLogger and also redirects the request to a specified (modified) URL;

RequestLogger uses the Java Servlet API to get or create, as required, a session identifier, and gets or creates a Session Java object attached to this identifier;

Session, which is instantiable as Session objects which contain the number of requests made in a session, and the time of the last request.

This information is formatted into a human-readable form, and then a new record is inserted into a database, such as IBM Corporation's DB2 database, using JDBC services. The database connection is managed by the RequestLogger class, opening it when the application server is started.

FIG. 3 provides a representation of the flow of the request through the network components, and modification of the URL within a request at each redirection step, in accordance with an embodiment of the invention. A request from a Web Browser is shown being received at a Web server 210 on a first computer system. The request is then modified to include redirection information and a modified URL for the requested resources, and forwarded to a servlet 220 running within a remote Web application server 230. This servlet checks for a valid session identifier, generates a new session identifier when required, and logs the request to a database 240. The servlet then redirects the request back to the Web server using the modified URL, and the Web server processes this URL to access the required resources and then replies to the Web Browser which initiated the communication.

FIG. 4 provides an example sample of the log records obtainable from use of a system implementing the invention.

Applying the present invention to non-HTML content could be implemented in the same way as described above, except that extra configuration lines and renaming conventions would be required (such as to rename .gif files to .gif1) and a new line would be required in the server configuration file to trigger the appropriate redirection.

As noted previously, the invention is particularly advantageous for enabling tracking of an individual user's navigation within an intranet or Internet Web site where the Web site is already established and tracking capability is required without having to rewrite the Web site or significantly recode the Web server.

What is claimed is:

1. A method for tracking a plurality of Web Browser requests for access to resources within a particular Web site, the method comprising:

loading a configuration file for a Web server into memory;

processing one or more redirection statements in the configuration file;

for requests sent from a Web browser to a Web server for access to resources within the Web site, comparing within the Web server each of the requests with a set of redirection criteria disposed in the redirection statements stored in the configuration file of the Web server;

for requests which match the redirection criteria, from within the Web server forwarding the request to a request tracker separate from the Web server, the request tracker tracking Web Browser requests for access to resources within a particular Web site; and, the request tracker determining an explicit session identifier, logging the request together with the explicit session identifier, and forwarding the request back to the Web server for processing, wherein the request tracker comprises a process running within a Web application server.

2. A method according to claim 1, wherein said process comprises a Java Servlet running within a Java Virtual Machine of the Web application server.

3. A method according to claim 1, wherein the redirection criteria include the URL name of a home directory of the Web site.

4. A method according to claim 1, wherein the comparing step is implemented by the Web server and comprises comparing requests with a set of redirection statements within the Web server's configuration file.

5. A method according to claim 1, wherein the explicit session identifier further comprises:

a validity time period.

6. A method according to claim 1, wherein the step of determining an explicit session identifier by the request tracker comprises checking whether the request has a valid cookie associated therewith and, if so, extracting an explicit session identifier from the cookie or, if not, generating a new cookie and an explicit session identifier.

7. A method for tracking a plurality of Web Browser requests for access to resources within a particular Web site, the requests having been sent from a Web Browser to a Web server for accessing resources within the Web site and then having been redirected to a request tracker separate from the Web server, the method implemented by the request tracker comprising:

receiving from the Web server in a request tracker that executes separately from the Web server, a redirected request for accessing a resource within the Web site;

determining an explicit session identifier from the request within the request tracker, the request tracker tracking Web Browser requests for access to resources within a particular Web site, logging in a database managed by a database server the request together with the explicit session identifier, and redirecting the request back to the Web server for processing, said determining, logging and redirecting steps being performed externally to the Web server and the Web Browser by the request tracker.

8. A data processing apparatus including a Web application server, the Web application server including a request tracker for tracking a plurality of Web Browser requests for access to resources within a particular Web site accessible via a Web server, the requests having been sent from a Web Browser to the Web server for accessing resources within the Web site and then having been redirected to the request tracker, the request tracker comprising means for:

receiving from the Web server in a request tracker that executes separately from the Web server, a redirected request for accessing a resource within the Web site;

determining from the request in the request tracker, the request tracker tracking Web Browser requests for access to resources within a particular Web site, an explicit session identifier for the request, logging in a database managed by a database server the request together with the explicit session identifier, and redirecting the request back to the Web server for processing, the determining, logging and redirecting steps being performed externally to the Web Browser and Web server by the request tracker.

9. A computer program product comprising computer program code recorded on a computer-readable recording medium comprising a storage device, for controlling the operation of a data processing apparatus on which the program code executed, the program code comprising:
- a first code component in a Web server for loading a configuration file for the Web server into memory, for processing one or more redirection statements in the configuration file, for receiving requests from a Web browser for access to resources within a particular Web site accessible via the Web server, for comparing each received request with a set of redirection criteria disposed in the redirection statements stored in the configuration file of the Web server and, responsive to identifying a match with the redirection criteria, for forwarding the modified request from the Web server to a request tracker component separate from the Web server; and
- a request-tracker code component, separate from the Web server and the Web browser, for determining an explicit session identifier for the request, logging the request together with the explicit session identifier, the request tracker tracking Web Browser requests for access to resources within a particular Web site, and redirecting the request back to the Web server for processing.

* * * * *